United States Patent
Hartley

[11] 3,908,133
[45] Sept. 23, 1975

[54] HIGH-LOW LEVEL CONTROL CIRCUIT

[75] Inventor: Nelson Hartley, Towson, Md.

[73] Assignee: Hartley Controls Corporation, Neenah, Wis.

[22] Filed: May 23, 1974

[21] Appl. No.: 472,790

[52] U.S. Cl. .............................. 307/118; 340/236
[51] Int. Cl.² ........................................ H01H 36/00
[58] Field of Search ........ 200/61.2, 61.21; 307/118; 340/236, 246, 244 R, 244 C; 317/149

[56] References Cited
UNITED STATES PATENTS

| | | | |
|---|---|---|---|
| 2,261,495 | 11/1941 | Ewertz | 340/244 C |
| 2,955,466 | 10/1960 | Coles | 340/246 X |
| 3,540,027 | 11/1970 | Rauth et al. | 340/244 C |

*Primary Examiner*—Robert K. Schaefer
*Assistant Examiner*—M. Ginsburg
*Attorney, Agent, or Firm*—Joseph P. House, Jr.

[57] ABSTRACT

A high level probe and a low level probe are mounted at corresponding locations within a container of dry granular or powdered material. The probes are selectively coupled via an input relay to the signal input of a multi-stage amplifier. An output relay is coupled in series with the D.C. power supply for the amplifier and is actuated when the amplifier's total current drain reaches a predetermined value, which occurs when the dry material contacts the high level probe and increases the capacitance thereof. The output relay is coupled to the input relay via a transfer relay to switch the input from the high level probe to the low level probe when the output relay is actuated. The output relay remains actuated until the material level drops below the low level probe, at which time the output relay de-actuates, which switches the high level probe back to the amplifier input, and activates means for refilling the container with dry material. When the material reaches the high level probe again, the output relay actuates, which switches the refilling means off, and switches the low level probe to the amplifier input. The transfer relay switches between two calibrating rheostats, one of which is used to calibrate the output relay when the high level probe is connected in the circuit, and the other of which is used to calibrate the output relay when the low level probe is connected in the circuit. A third calibrating rheostat is coupled in series with the first mentioned rheostats to compensate for the distributed capacitance of the cables coupled to the two probes.

8 Claims, 1 Drawing Figure

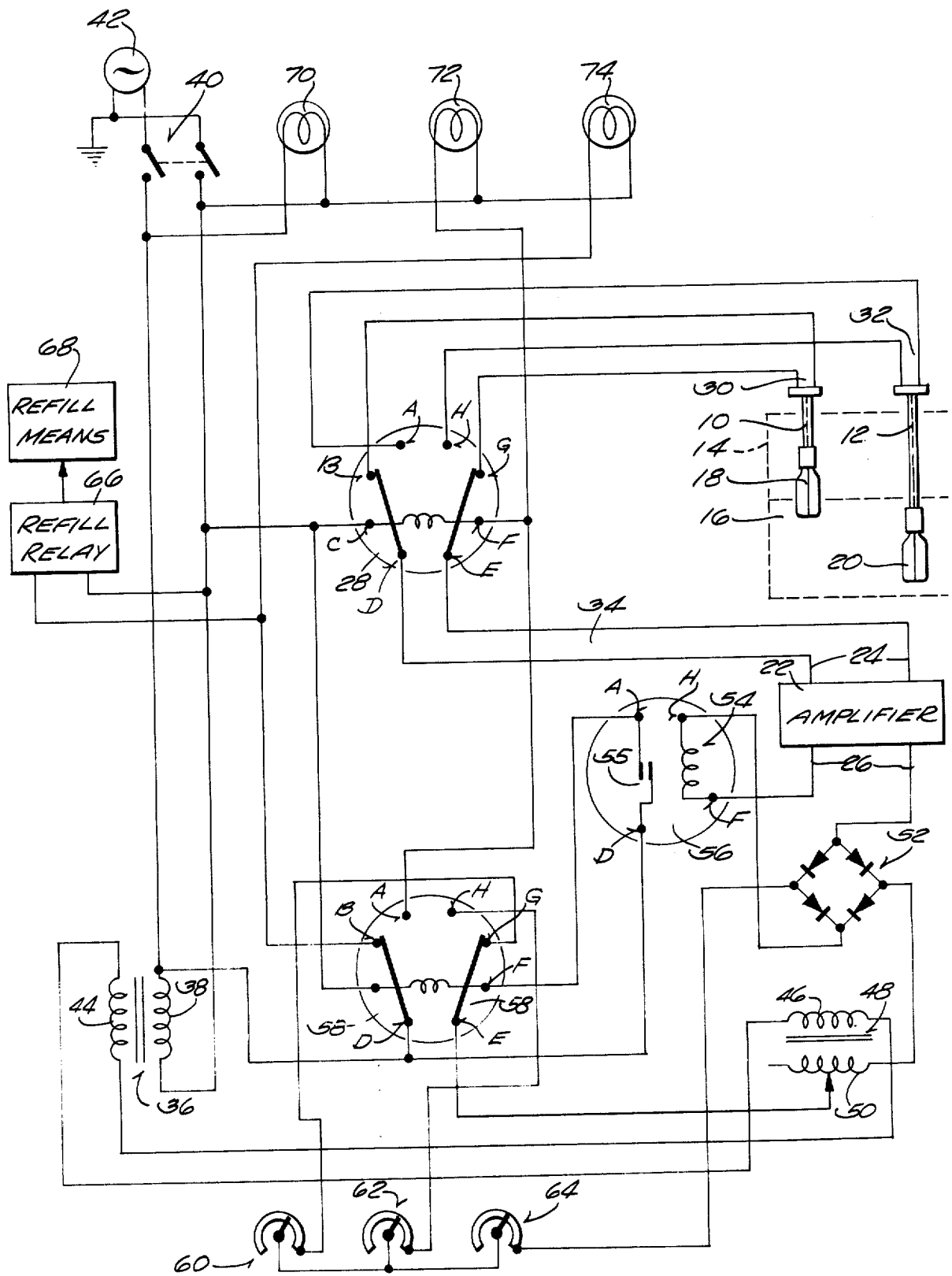

3,908,133

HIGH-LOW LEVEL CONTROL CIRCUIT

BACKGROUND OF THE INVENTION

This invention relates to control circuits for automatically refilling a container of dry granular or powdered material, e.g., foundry sand, and for maintaining the level of the material between a high level probe and a low level probe which are mounted at corresponding locations within the container. Control apparatus of this general type have been manufactured in the past, but the prior control devices have the disadvantage of requiring separate amplifiers for the high level probe and low level probe. Also, the prior control devices are limited with respect to the length of cable that can be used for coupling the probes to their respective amplifiers. This is due to the fact that beyond a limiting length, the capacitance of long cables exceeds the range of input capacitance for which these prior circuits will operate accurately.

SUMMARY OF THE INVENTION

This invention provides a control circuit in which a common amplifier is used for both the high level and the low level probes. The control circuit of this invention contains calibrating rheostats by which the circuit may be calibrated to operate accurately with any desired cable length between the amplifier and the probes. The control circuit of this invention includes a current responsive device which is coupled in series with the power supply current so as to be responsive to the total current drain of the amplifier, rather than to only a portion thereof. The foregoing objects are attained by novel circuit configurations which are defined in the annexed claims. Other objects, features and advantages of the invention will become apparent to those skilled in the art from the disclosure hereof.

DESCRIPTION OF THE DRAWING

The FIGURE is a schematic circuit diagram and block diagram of the preferred embodiment of this invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawing, a high level probe 10 and a low level probe 12 are mounted at corresponding locations within a container 14 for dry granular or powdered material 16. Probes 10 and 12 may be of any suitable construction and preferably terminate in flat blades 18 and 20 respectively which serve as one plate of a capacitor whose other plate is ground. Probe blades 18 and 20 are insulated from the body of the corresponding probe 10, 12 and are positioned to be clear of the walls of container 14. When the level of material 16 is below either of the probe blades 18, 20, the corresponding probe 10, 12 has a relatively low value of capacitance which depends on the area of the blades 18, 20 and their distance from the nearest grounded electrically conductive surface, plus the capacitance of the cables connected thereto.

When material 16 contacts either of the probe blades 18, 20, the capacitance of the corresponding probe 10, 12 is increased. Thus, an increase in the capacitance of either of the probes 10, 12 is an indication that the corresponding probe blade 18, 20 is in contact with the material 16.

A conventional multi-stage amplifier 22 having signal input terminals 24 and power input terminals 26 forms a part of this embodiment. The signal input terminals 24 are coupled to probes 10 and 12 through an input relay 28 which is wired to couple high level probe 10 to input terminals 24 when relay 28 is de-energized and to couple low level probe 12 to input terminals 24 when relay 28 is energized. The cables 30, 32 which couple probes 10 and 12 to relay 28 and the cable 34 which couples relay 28 to signal input terminals 24 are all shielded to prevent the circuit from being actuated by changes of capacitance due to movement of material adjacent cables 30, 32 or 34. The shielded cables 30, 32 and 34 insure that the circuit will only be actuated by changes of capacitance in the neighborhood of probe blades 18 and 20.

Input relay 28 is double pole-double throw type in which terminals D and E are the two common terminals, terminals B and G are the normally closed terminals, and terminals A and H are the normally open terminals. Terminals C and F are the relay coil terminals. When the relay coil is de-energized, common terminals D and E are connected respectively to normally closed terminals B and G, thereby coupling high level probe 10 to the signal input terminals 24 of amplifier 22. When the coil of relay 28 is energized, the relay switches the common terminals D and E from normally closed terminals B and G to normally open terminals A and H, thereby coupling low level probe 12 to signal input terminals 24.

The power supply for the circuit includes a constant voltage transformer 36 whose primary winding 38 is coupled via a double pole-single throw switch 40 to a 110 V.A.C. power source 42. The secondary winding 44 of constant voltage transformer 36 is coupled to the primary winding 46 of a voltage step down transformer 48 whose secondary winding 50 is coupled in series with the input of a rectifier bridge 52 that provides 12 V.D.C. for amplifier 22. The output of rectifier bridge 52 is coupled to power input terminals 26 of amplifier 22 in series with the coil 54 of an output relay 56.

Output relay 56 is a current level sensitive relay whose movable contact 55 is actuated when the current level in coil 54 rises above a predetermined level and remains actuated as long as the current in coil 54 remains above a minimum holding current level. When output relay 56 is actuated, common terminal D is coupled to normally open terminal A and remains coupled thereto as long as relay 56 remains actuated. Since common terminal D is coupled to the 110 V.A.C. input, and terminal A is coupled to coil terminal F of a transfer relay 58, whose other terminal C is grounded, the coupling of terminals A and D of output relay 56 energizes the coil of transfer relay 58, which is the same type of relay as input relay 28. When transfer relay 58 is energized, its common terminal D is coupled to normally open terminal A, thereby applying 110 V.A.C. to coil terminal F of input relay 28 and energizing relay 28. Thus the actuation of output relay 56 energizes both the transfer relay 58 and the input relay 28. The input relay 28 controls which of the two probes 10, 12 will be coupled to the signal input terminals 24 of amplifier 22. The transfer relay 58 serves to energize input relay 28 and also to initiate refilling of container 14 and to switch a calibrating circuit described below.

Three rheostats 60, 62 and 64 are provided for calibrating the circuit so that it will respond properly to the change of capacitance on probe blades 18 and 20. Rheostat 64 is coupled in series with the A.C. input to rectifier bridge 52 and is also coupled in series with both rheostats 60 and 62, which are coupled in parallel with each other. Rheostat 60 is coupled to normally closed terminal G of transfer relay 58 and rheostat 62 is coupled to normally open terminal H of transfer relay 58. Accordingly, when transfer relay 58 is de-energized, calibration rheostats 64 and 60 are connected in series with the A.C. input to rectifier bridge 52 and can be varied to control the level of D.C. output current from rectifier bridge 52. This in turn varies the current flow through coil 54 of output relay 56 and determines the amount of capacitance changes in high level probe 10 which is required to actuate output relay 56.

When transfer relay 58 is energized, calibration rheostats 64 and 62 are connected in series with the A.C. input to recitifier bridge 52 and can be adjusted to control the dropout of output relay 56, i.e., the amount of capacitance change in low level probe 12 that is required to cause normally open terminal A to open. Thus rheostat 60 serves to calibrate actuation of output relay 56, which occurs when material 16 contacts the blade 18 of high level probe 10, and rheostat 62 serves to calibrate dropout of output relay 56, which occurs when material 16 drops below the blade 20 of low level probe 12. Rheostat 64, which is common to both calibration circuits, is used to compensate for distributed capacitance in the length of the shielded input cables 30, 32, 34, which couple the probes 10, 12 to the signal input terminals 24 of amplifier 22.

The common terminal D of transfer relay 58 is coupled to the 110 V.A.C. input line and the normally closed terminal B of transfer relay 58 is coupled to one input terminal of a refilling relay 66 whose other input terminal is grounded. Refilling relay 66 actuates a suitable refilling means 68 which refills container 14 with material 16. Thus when transfer relay 58 returns to its de-energized condition, it activates refilling means 68, which continues to operate until refilling relay 66 is de-energized by the energization of transfer relay 58.

In this embodiment, three lamps 70, 72, 74 are provided for indicating the operating condition of the circuit. Lamp 70 is the pilot lamp and is wired to turn on whenever switch 40 is closed. Lamp 72 is the high condition indicator and is wired to turn on whenever transfer relay 58 is energized, i.e., whenever output relay 56 is actuated. Lamp 74 is the low condition indicator and is wired to turn on whenever transfer relay 58 is de-energized, i.e., whenever output relay 56 is de-actuated.

To calibrate the circuit, container 14 is filled with material 16 up to the desired maximum level. Probe 10 is then adjusted so that approximately half of blade 18 is covered by material 16. Rheostat 60 is then centered, and rheostat 64 is turned until output relay 56 actuates as indicated by the lighting of lamp 72. If output relay 56 is actuated when the calibration process begins, rheostat 64 is first turned until output relay 56 de-actuates, and is then adjusted for actuation of output relay 58. Next, container 14 is emptied down to the desired minimum level. Probe 12 is then adjusted so that approximately half of blade 20 is covered by material 16. Rheostat 62 is then adjusted until output relay 56 de-actuates as indicated by the lighting of lamp 74. The de-actuation of output relay 56 also initiates the operation of refilling means 68 which adds material 16 to container 14. After the initial calibration, rheostat 60 is used to adjust the high level switching while rheostat 62 is used to adjust the low level switching.

The operating cycle of this embodiment is as follows, starting with refilling means 68 in operation: material 16 is added to container 14 until it reaches half way up probe blade 18, at which time the increased capacitance of blade 18 causes the current drain in multistage amplifier 22 to rise to a level which actuates output relay 56. This actuates transfer relay 58 which in turn actuates input relay 28. Transfer relay 58 de-actuates refilling relay 66 which stops refilling means 68. Transfer relay 58 also switches rheostat 60 out of the circuit and switches rheostat 62 in its place. Input relay 28 disconnects high level probe 10 from the circuit and connects low level probe 12 in its place. Since the blade 20 of low level probe 12 is covered by material 16 at this time, its capacitance holds output relay 56 actuated as long as the material 16 covers probe blade 20.

When the level of material 16 has fallen half way down probe blade 20, the drop of capacitance of probe blade 20 causes the current drain of amplifier 22 to drop below the holding level for output relay 56, which therefore de-actuates and causes transfer relay 58 and input relay 28 to de-actuate. This actuates refilling relay 66, which re-initiates the operation of refilling means 68. The de-actuation of transfer relay 58 switches rheostat 62 out of the circuit and switches rheostat 60 in its place. The de-actuation of input relay 28 disconnects low level probe 12 from the circuit and connects high level probe 10 in its place.

The foregoing operation cycle is repeated continuously as long as the control circuit is in operation.

The means for switching between high level probe 10 and low level probe 12 and between their respective calibrating rheostats 60 and 62 is an important feature of this invention because it permits a common amplifier circuit 22 and output relay 56 to be used for both probes 10 and 12. The calibrating rheostat 64 which is connected in series with rheostats 60 and 62 is also an important feature of the invention because it permits calibration for any desired length of shielded conductors connected between probes 10, 12 and amplifier 22. The connection of output relay 56 in series with rectifier bridge 52 is important because it utilizes all of the current drain of amplifier 22 to actuate output relay 56 instead of just utilizing the current drain of the final stage as has been the practice heretofore. Utilizing the total current drain of amplifier 22 for output relay 56 maximizes the sensitivity thereof in response to a given variation of input capacitance.

I claim:

1. A level responsive circuit for initiating a predetermined action in response to the level of material in a container, comprising a first probe located at a first predetermined level in said container, a second probe located at a second predetermined level in said container, an amplifier circuit having signal input terminals, switch means coupled between said first and second probes and said signal input terminals and operable to couple said first probe to said signal input terminals in a first position of the switch means and to couple said second probe to said signal input terminals in a second position of the switch means, a current responsive device coupled to said amplifier circuit, said current responsive device having two different states and being switchable to its first state in response to a first level of current flow therethrough and being switchable to its second state in response to a second level of current flow therethrough, means coupled to said current responsive device for initiating said predetermined action in response to one state thereof and for terminating the action in response to the other state thereof, and means coupled between said current responsive device and said switch means for switching said switch means to its first state in response to the first state of said current responsive device and for switching said switch means to its second state in response to the second state of said current responsive device, thereby permitting one amplifier circuit and one current responsive device to be used for the both probes.

2. The circuit of claim 1 and further comprising at least two variable impedance elements and additional switch means for selectively coupling said variable impedance elements in series with said current responsive device in such manner that one of said variable impedance elements is in series with said current responsive device in one state thereof and the other variable impedance element is in series with said current responsive device in the other state thereof, whereby each variable impedance element serves as a calibration device for said current responsive device when a corresponding one of said probes is coupled to the input of said amplifier circuit.

3. The circuit of claim 2 and further comprising a third variable impedance element coupled in series with both of said two variable impedance elements whereby said third variable impedance element serves as a calibration device for said current responsive device when either of said probes is coupled to the input of said amplifier circuit, thereby enabling said probes to be coupled to the input of said amplifier circuit by conductors of any desired length.

4. The circuit of claim 1 wherein said means coupled to said current responsive device to initiate said predetermined action comprises a relay coupled to said current responsive device and responsive to the state thereof, and refilling means for refilling said container with said material, said refilling means being coupled to said relay and being responsive thereto to initiate refilling in response to one state of said relay and to terminate refilling in response to the other state of said relay.

5. The circuit of claim 1 wherein said amplifier circuit has power input terminals, and further comprising a current source coupled in series with said power input terminals, and said current responsive device being coupled in series with said current source so as to be responsive to the total current drain of said amplifier circuit.

6. The circuit of claim 5 and also comprising two variable impedance elements and switch means for coupling one of said variable impedance elements in series with said current responsive device in one state thereof and for coupling the other variable impedance element in series with said current responsive device in the other state thereof, whereby said one variable impedance element serves as a calibration device for said current responsive device in one state thereof and said other variable impedance element serves as a calibration device for said current responsive device in the other state thereof.

7. The circuit of claim 6 and further comprising a third variable impedance element coupled in series with said current responsive device and in series with both of the first mentioned variable impedance elements, whereby said third variable impedance element serves as a calibration device for said current responsive device in both states thereof and enables said probes to be coupled to the input of said amplifier circuit by conductors of any desired length.

8. The circuit of claim 7 wherein said current source is a rectifier bridge and means for applying an A.C. voltage to the A.C. input thereof, the D.C. output of said rectifier bridge being coupled to the power input terminals of said amplifier circuit, and wherein said three variable impedance elements are rheostats, two of said rheostats being coupled in parallel with each other and in series with said current responsive device, and the third rheostat being coupled in series with said current responsive device and in series with both of the other two rheostats.

* * * * *